Patented May 31, 1932

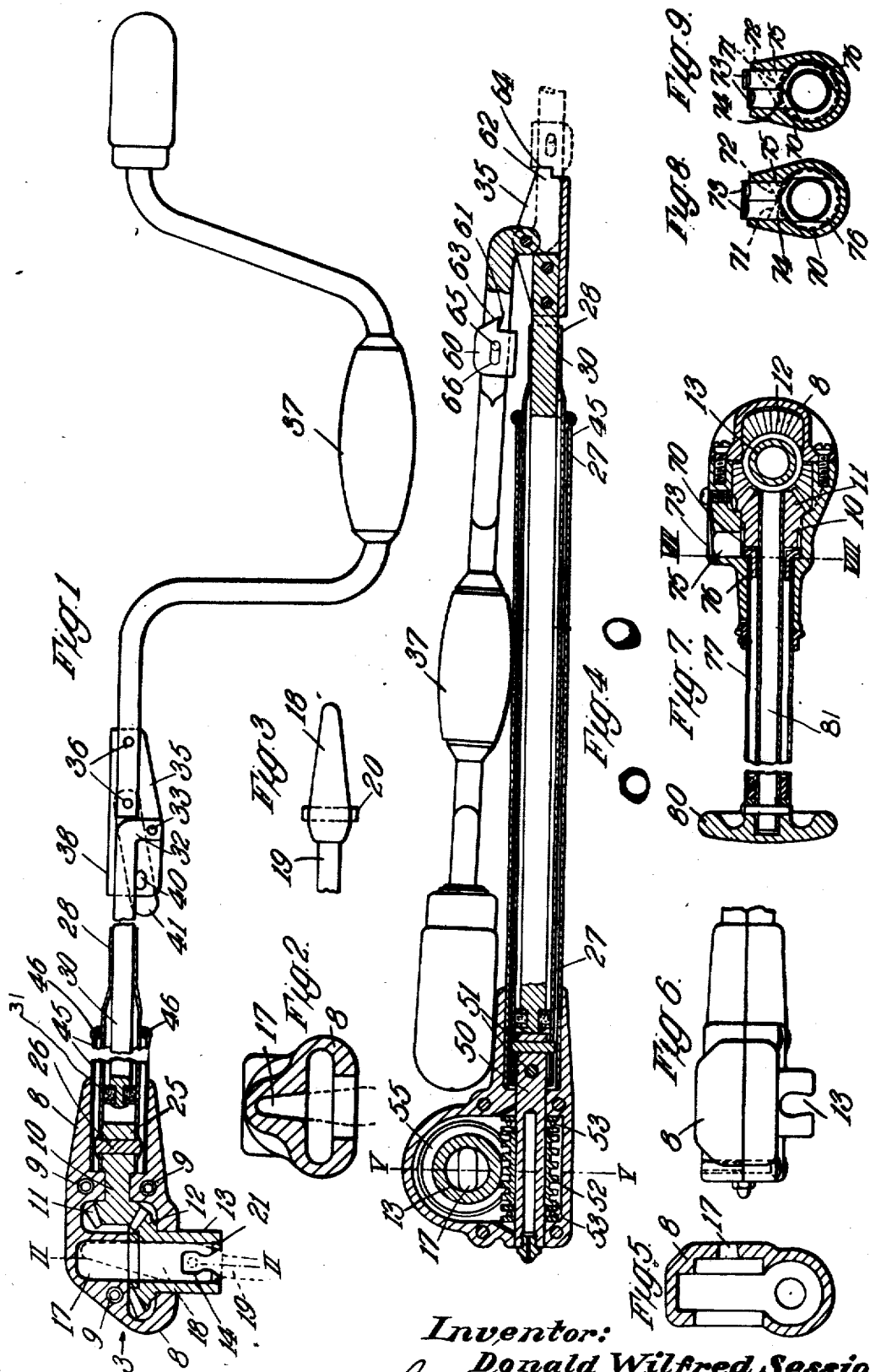

1,861,326

UNITED STATES PATENT OFFICE

DONALD WILFRED SESSIONS, OF LONDON, ENGLAND

DEVICE FOR OPERATING LIFTING JACKS

Application filed August 12, 1930, Serial No. 474,795, and in Great Britain October 17, 1929.

This invention relates to devices for operating lifting jacks of the kind having an operating screw or the like, rotation of which brings about collapse or extension of the jack.

According to the invention the end of the jack operating screw engages and is rotatable by a socket or like member, the engagement of the screw with the device permitting movement of the free end of the device to a limited extent horizontally. The end of the jack operating screw may be provided with a tapered nose which engages at its larger diameter in the socket and at its small end in an elongated recess or aperture forming a continuation of the socket, the device preferably comprising a casing, a spindle mounted in the casing, a rotatable socket member disposed at one end of and at right angles to the spindle and operatively connected thereto, the casing having an elongated horizontal recess or aperture forming a continuation of the socket.

In order that the said invention may be clearly understood and readily carried into effect the same will now be described more fully with reference to the accompanying drawings, in which:—

Figure 1 is a view partly in longitudinal section of a device constructed in accordance with the invention.

Figure 2 is a section on line II—II of Figure 1.

Figure 3 is a view of the end of the jack operating screw viewed in the direction of the arrow 3 in Figure 1.

Figure 4 is a view similar to Figure 1 of a modified form of the device.

Figure 5 is a section of the casing on the line V—V of Figure 4.

Figure 6 illustrates a modified form of the socket member.

Figure 6 illustrates a modified form of the further modification, and

Figures 8 and 9 are sections on the line VIII—VIII of Figure 7, these Figures 8 and 9 showing the parts in two different positions.

The housing or casing 8 is made in halves bolted together by bolts 9 and providing a bearing for a short shaft or boss 10 formed integrally with a bevel wheel 11 in gear with a second bevel wheel 12 formed with a boss or cylindrical sleeve 13 projecting out of the housing and apertured to form a socket and having two diametrically T-shaped or bayonet joint slots 14. The elongated slot 17 forms a continuation of the socket formed by the sleeve 13. The elongation of the recess 17 is in the direction of the length of the casing and its width is such as to receive the small end of the tapered or conical nose 18 on the end of the jack operating screw 19 with but little clearance so that movement of said end vertically or transversely of the recess is prevented. The tapered or conical nose 18 is secured to the spindle 19 by a pin 20 passing transversely therethrough and projecting therefrom at each side so as to engage in the slots 14, the outer ends of which are chamfered as shown at 21 to facilitate engagement of the pin in the slots. The tapered or conical nose 18 facilitates its being engaged in the socket and such engagement can be effected without the nose being first precisely aligned with the socket as would be necessary for example for engagement of a square ended spindle in a square socket. The ends of the pin 20 engage in the cross portions of the slots to prevent disengagement of the pin from the slots when the device is in operation. The nose 18 adjacent to the pin has a diameter as large as that of the socket by reason of which and of the engagement of the small end of the nose in the recess 17, movement of the casing about its longitudinal axis is prevented when the device is in use. It is to be observed, however, that movement of the device laterally in a horizontal plane due to unsteadiness on the part of the operator is permitted by reason of the elongation of the recess 17 so that any such unsteadiness will not result in strain upon the spindle 19 or any part of the operating device. Suitable means are provided for rotating the sleeve 13 through the bevel wheels 11 and 12 so as to operate the spindle 19. For this purpose an extension 25 of the shaft 10 is secured by a rivet 26 to a tube 27, the free end 28 of which is pressed into square section. Located within the tube 27 is a rod 30 of square section fitting the similarly shaped end 28 of the tube 27. The tube 27 and rod 30 thus form a telescopic spindle which can be collapsed into a small space for convenience of handling or for packing and transport. The inner end of the rod 30 is provided with a leather piston washer 31 adapted to fit within the tube 27 so as to provide a pneumatic cushioning which tends to prevent relative movement of the rod and tube so that these parts will not slip together or apart too easily and prevents complete withdrawal of the rod. The outer end of the rod 30 is bent at right angles to the main portion and pivoted at 33 to an angle or channel plate 35 secured by rivets 36 to the end of a handle 37 of the drill brace type. The handle 37 can be moved about the pivot 33 so as to lie against the remainder of the device to economize space when the device is not in use. Movement of the handle 37 into its operative position is limited by engagement of the rod 30 with the limb 38 of the angle plate 35 and the rod and angle plate are adapted to be held in these relative positions by a stud 40 carried by a plate spring 41 secured to the angle plate 35 by one of the rivets 36, the stud 40 passing through an aperture in the angle plate 35 and engaging the rod 30 and the latter being chamfered so that when the handle is opened the stud 40 is repressed. To provide a firm support or bearing for the tube 27 an outer tube 45 concentric with and surrounding the tube 27 is secured at one end to the casing 8 and at its other end supports balls 46 forming a ball bearing support for the free end of the tube 27. Rotation of the handle 37 rotates the rod 30 which by its engagement with the square portion 28 of the tube 27 rotates the latter and this tube operates the sleeve 13 through the bevel wheels which enable a reduction in gear to be obtained. It is to be observed that the handle 37 is capable of limited universal movement without strain being placed upon any of the parts of the device or jack. Vertical movement is permitted by the bevel wheels 11, 12 (either the nose 18 or the handle 37 being rotated to a small extent); horizontal movement is permitted by reason of the elongated recess 17; and rotary movement about the longitudinal axis of the device is utilized for operating the jack spindle. Rotary movement of the casing 8 and tube 45 is, however, prevented as already described. The location of the sleeve or socket member 13 at right angles to the length of the device enables the user to operate from the front of a car a jack that is secured to the front axle transversely of the car. If the socket were in line with the length of the device it would be necessary to operate such a jack through the wheel of the car and this would be not feasible in the case of disc wheels or cars fitted with front wheel brakes.

According to the modification illustrated in Figure 4 the tube 27 is secured to a spindle 50 by removable pins 51 and a worm 52 is mounted on the spindle 50 and is located between thrust bearings 53. In gear with the worm 52 is a worm wheel 55 that is formed with the socket sleeve 13. This arrangement has the advantage that the worm 52 and worm wheel 55 can readily be removed and others of different pitch substituted according to the gear reduction required. Spiral gears could be employed instead of the worm and worm wheel. Figure 4 also illustrates a modified means for maintaining the handle 37 in its extended position, such means comprising, instead of a flat spring and stud, a collar 60 having a projection 61 adapted to engage with an abutment 62 for the purpose of maintaining the handle 37 in its extended position. The collar and angle plate are formed with inclined surfaces 63, 64, respectively that co-operate to move the collar away from the angle plate when the handle is moved into its extended position, the collar then being moved by the operator to engage with the abutment 62. Movement of the collar is limited by a pin 65 on the handle engaging in a slot 66 in the collar.

According to the modification illustrated in Figures 7, 8 and 9, the shaft or boss 10 of the bevel wheel 11 is cut to form a ratchet wheel having square cornered teeth 70 and two pawls 71, 72, lying side by side are provided and are pressed by means of a split plate spring 73 towards the ratchet 70. Each of these pawls is formed with an integral cam block 74, 75, both of which are engaged by a cam block 76 rotatable by a sleeve 77 connected thereto. The cam is adapted to be moved into one or other of two extreme positions or into an intermediate position. In one extreme position the cam permits one only of the pawls to engage with the ratchet wheel; in its other extreme position it permits only the other of the two pawls to engage with the ratchet wheel; and in its intermediate position (Figure 8) it maintains both pawls disengaged from said wheel. One of the pawls permits rotation of the ratchet in the one direction, while the other pawl permits rotation of the ratchet only in the opposite direction. The device in this modification is provided with the form of handle 80 shown. When it is desired to use the jack the device is engaged with the jack operating spindle and with the sleeve 77 and cam 76 in their intermediate positions (in which both pawls are disengaged from the ratchet wheel—Figure 8), the handle and consequently also the spindle and bevel wheels are rotated until the lower portion of the jack rests on the ground. The sleeve 77 is then rotated into the appropriate extreme position so as to bring the appropriate pawl 71 or 72 into engagement with the ratchet 70 whereupon the handle 80 is moved up and down about the axis of the socket and sleeve 13 so that the device is used as a lever, movement of which in one direction causes the bevel wheel 11 to act as a fixed member engaging the bevel wheel 12 which it rotates and movement in the opposite direction causes the bevel wheel 11 to rotate idly. When it is desired to collapse the jack the sleeve 77 and cam 76 will be moved to their other extreme positions and the handle 80 again moved up and down as a lever, and as the other of the pawls 71 or 72 will then be engaged with the ratchet wheel the sleeve 13 will rotate in the direction to bring about collapse of the jack.

Instead of forming the sleeve 13 with T-shaped slots the latter may be horse-shoe shaped as shown in Figure 6 so that the ends of the pin 20 will tend to move inwardly riding down the inclined edges of the slots when the device is in operation so as to militate against disengagement of the device from the screw when the device is in operation.

What I claim and desire to secure by Letters Patent of the United States is:—

1. Means for operating lifting jacks comprising a jack operating screw, a tapered nose on the end of said screw, and a device for rotating the screw comprising an elongated support having a recess which fits the small end of the nose widthwise so as to prevent rotary displacement of the support about its longitudinal axis when engaged with said nose and which recess is wider than said nose in the direction lengthwise of the support to permit limited horizontal movements of the device, a hollow member for engagement with the large diameter portion of the nose mounted in alignment with said recess at one end of the support and rotatable about an axis at right angles to the length of the support, and means carried by the support whereby said hollow member can be rotated.

2. Means as in claim 1 wherein a pin carried by the screw engages two diametrically opposite horse-shoe shaped slots in the hollow member so that the pin tends to slide inwards along the inclined surfaces of the slots when the device is operated thereby.

3. Means for operating lifting jacks comprising a jack operating screw, a conical nose on the end of said screw, and a device for rotating the screw comprising a housing having a recess which fits the small end of the nose widthwise so as to prevent rotary displacement of the support about its longitudinal axis when engaged with said nose and which recess is wider than said nose in the direction lengthwise of the support to permit limited horizontal movements of the device, a bevel wheel rotatably mounted in said housing, a collapsible handle attached at one end to said bevel wheel the axis of the bevel wheel being in alignment with the length of the handle, a tubular member secured at one end to the housing, and extending outwardly therefrom and forming at its outer end a bearing for the handle, a hollow member for engagement with the large diameter portion of the nose mounted in the housing and rotatable about an axis at right angles to the axis of the bevel wheel, and bevel teeth carried by the hollow member and in gear with the bevel wheel.

4. Means as in claim 1 having two bevel wheels carried by the support one of which is provided with circumferential ratchet teeth, two pawls movable radially with respect to the bevel wheel carrying said teeth, resilient means tending to move the pawls into engagement with said teeth, a rotary cam capable of holding either or both pawls out of engagement with said teeth, a rotatable sleeve fixed to said cam for rotating the cam, and a rotatable spindle passing through said sleeve and secured to the bevel wheel that carries said teeth.

DONALD WILFRED SESSIONS.